US008047085B2

(12) United States Patent
Cady et al.

(10) Patent No.: US 8,047,085 B2
(45) Date of Patent: Nov. 1, 2011

(54) FORCE MONITORING METHODS AND APPARATUS

(75) Inventors: Raymond C. Cady, Horseheads, NY (US); James P. Peris, Horseheads, NY (US); G. Clinton Shay, Moneta, VA (US)

(73) Assignee: Corning Incorporated, Corning, NY (US)

( * ) Notice: Subject to any disclaimer, the term of this patent is extended or adjusted under 35 U.S.C. 154(b) by 204 days.

(21) Appl. No.: 12/472,840

(22) Filed: May 27, 2009

(65) Prior Publication Data

US 2010/0300214 A1    Dec. 2, 2010

(51) Int. Cl.
*G01L 5/12* (2006.01)
(52) U.S. Cl. .................................... 73/862.49
(58) Field of Classification Search ............ 73/760–860, 73/862.49
See application file for complete search history.

(56) References Cited

U.S. PATENT DOCUMENTS

| | | | | |
|---|---|---|---|---|
| 3,977,858 | A | * | 8/1976 | Taguchi ........................... 65/158 |
| 3,998,616 | A | * | 12/1976 | Farabaugh ..................... 65/29.14 |
| 4,112,751 | A | | 9/1978 | Grünbaum ..................... 75/141 A |
| 4,187,614 | A | * | 2/1980 | Abiru et al. ....................... 33/559 |
| 4,337,076 | A | * | 6/1982 | Shaw, Jr. ....................... 65/29.14 |
| RE31,312 | E | | 7/1983 | Eddens ....................... 73/862.48 |
| 4,440,559 | A | * | 4/1984 | Shaw, Jr. ........................ 65/99.5 |
| 4,796,474 | A | | 1/1989 | Koenig ....................... 73/862.65 |
| 5,159,841 | A | | 11/1992 | Montalvo et al. ........ 73/862.474 |
| 6,920,801 | B2 | | 7/2005 | Van Leeuwen et al. ... 73/862.49 |
| 7,430,880 | B2 | | 10/2008 | Butts et al. ....................... 65/253 |
| 7,469,593 | B2 | | 12/2008 | Zumberge et al. ............... 73/777 |
| 2004/0050323 | A1 | * | 3/2004 | Chae ............................. 118/400 |
| 2009/0107182 | A1 | | 4/2009 | Anderson et al. ................. 65/90 |

FOREIGN PATENT DOCUMENTS

WO    WO 2005/121034    12/2005

OTHER PUBLICATIONS

Breen, et al., "Better Web Process Control Through Tension Sensing", Dover Flexo Electronics, Inc., Rochester, New Hampshire, 1999.
A.H. Burr, "Mechanical Analysis and Design", Elsevier North Holland, 1981, p. 400.
ABB Automation Technologies AB's brochure entitled "Tension measurement for web processes", Västerås, Sweden.
Vishay Intertechnology, Inc.'s brochure entitled "HTU Web Tension Measurement Systems", Canton Massachusetts.

* cited by examiner

*Primary Examiner* — Max Noori
(74) *Attorney, Agent, or Firm* — Thomas R. Beall

(57) ABSTRACT

Methods and apparatus (7) for monitoring the tension (17) and pinch force (19) associated with the contact of angled stub rollers (91) with a glass ribbon (23) are provided. The apparatus (7) includes a support member (39) which supports the shaft (13) of the stub roller (91). The support member (39) undergoes linear displacement (45) in response to tension (17) in the glass ribbon (23) and rotation (59) in response to a pinch force (19). The linear displacement (45) and rotation (59) are detected and converted to force values by a calibration procedure. By monitoring these forces, glass attributes such as residual stress can be improved which is of importance in glass sheets used in such applications as the manufacture of liquid crystal displays.

19 Claims, 6 Drawing Sheets

FORCE MONITORING METHODS AND APPARATUS

FIELD

This disclosure relates to glass manufacturing and, in particular, to methods and apparatus for monitoring the forces generated when, for example, the surface of a roller contacts the surface of a glass ribbon. By monitoring such forces, the properties of glass sheets separated from the ribbon can be improved, e.g., the residual stress and warp in the sheets can be reduced which is advantageous when the sheets are used as substrates in liquid crystal displays.

BACKGROUND

Glass ribbons are produced in various downdraw glass manufacturing processes, e.g., the fusion downdraw process, as well as in the float process. The tension in the ribbon and, in particular, the across-the-ribbon tension, is important in controlling the flatness of the ribbon as well as the residual stress in individual glass sheets produced from the ribbon. The across-the-ribbon tension can be controlled by, for example, contacting the surface of the ribbon with rollers oriented at an angle to the direction of motion of the ribbon (referred to herein as "stub rollers" or "stub rolls"). Such rollers stabilize the ribbon and apply a tension force to the ribbon in the across-the-ribbon direction, as well as a "pinch" force in a direction normal to the surface of the ribbon.

Prior to the present disclosure, there has been no known method of monitoring the forces exerted on the ribbon by such rollers. The present disclosure provides methods and apparatus for monitoring these forces in real time without adversely affecting the glass forming process. The data provided by these methods and apparatus can, for example, be used to provide feedback to process engineers so that adjustments can be made to the forming process, including adjustments that result in improved glass attributes, e.g., lower residual stress levels.

SUMMARY

In a first aspect, a method is disclosed for monitoring a component of the force applied to a shaft (13) as a result of contact of a portion (15) of the shaft (13) with a moving glass ribbon (23), the force component being in an across-the-ribbon direction, the method including:

(a) supporting the shaft (13) with a support member (39) that undergoes linear displacement (45) in the across-the-ribbon direction in response to the application to the shaft (13) of a force which includes the across-the-ribbon force component; and (b) monitoring the linear displacement (45) of the support member (39).

In a second aspect, a method is disclosed for monitoring a component of the force applied to a shaft (13) as a result of contact of a portion (15) of the shaft (13) with a moving glass ribbon (23), the force component being in a direction normal to the ribbon, the method including:

(a) supporting the shaft (13) with a support member (39) that undergoes rotation (59) about an axis in response to the application to the shaft (13) of a force which includes the normal-to-the-ribbon force component, the axis being parallel to the surface of the ribbon; and (b) monitoring the rotation (59) of the support member (39).

In a third aspect, apparatus is disclosed for monitoring a component of an axial force that acts along a centerline of a shaft (13), the apparatus including:

(a) a shaft (13);

(b) a support assembly (7) for the shaft (13), the support assembly (7) including a support member (39) that is linearly displaceable (45) in response to the component of the axial force, the displacement (45) being along a line and the line and the shaft's centerline lying in a common plane or in planes that are parallel to one another; and (c) a sensor (47,51) for monitoring linear displacement (45) of the support member (39) along the line.

In a fourth aspect, apparatus is disclosed for monitoring a force (57) that acts normal to a centerline of a shaft (13), the apparatus including:

(a) a shaft (13);

(b) a support assembly (7) for the shaft (13), the support assembly (7) including a support member (39) that is rotatable (59) in response to a force (57) normal to the centerline of the shaft (13); and (c) a sensor (53,55) for monitoring rotation (59) of the support member (39).

The reference numbers used in the above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

Figure 1:
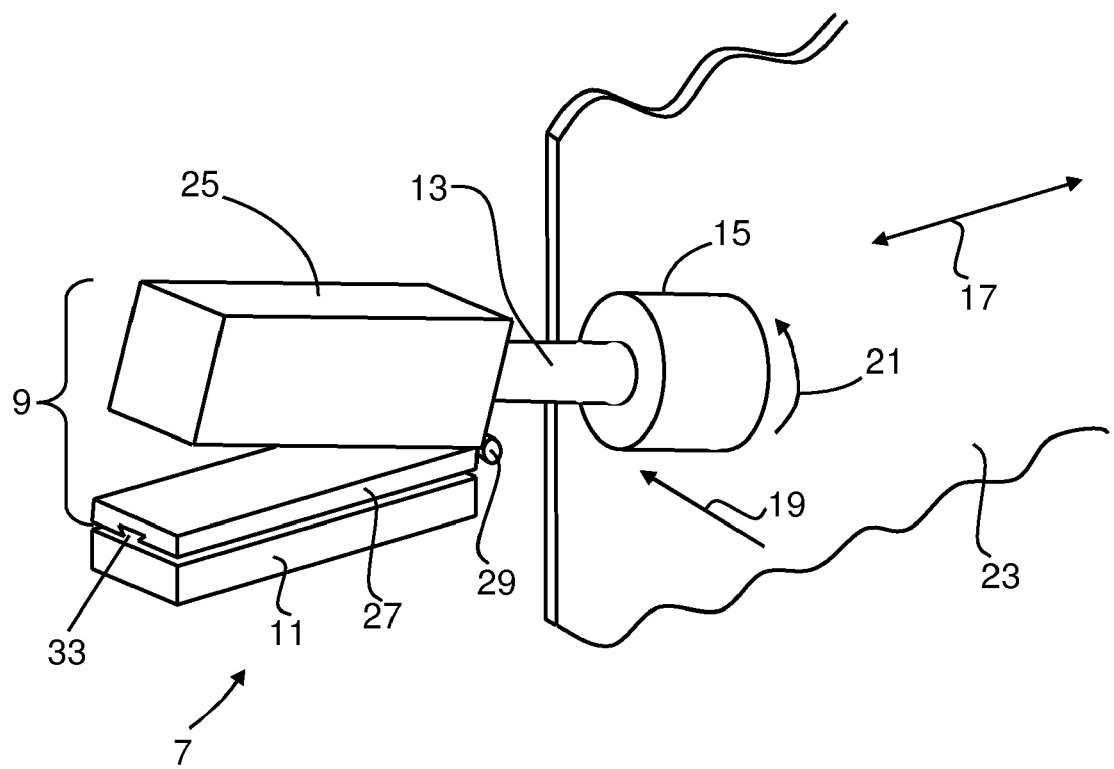
FIG. 1 is a schematic perspective view of an embodiment of force monitoring apparatus.

The reference numbers used in the drawings refer to the following:

7 support assembly
9 first subassembly of support assembly
11 second subassembly of support assembly
13 shaft
15 roller
17 tension arrow
19 pinch force arrow
21 rotation arrow
23 glass ribbon
25 housing
27 plate
29 pivot
31 male portion of dovetail
33 female portion of dovetail
35 bearing assembly
37 frame
39 support member
41 web
43 arrows illustrating assembly of first and second subassemblies
45 arrow illustrating linear displacement of support member
47 linear displacement sensor
49 initial position of sensor target
51 final position of sensor target
53 amplification arm for rotation sensing
55 rotation sensor
57 arrow illustrating pinch force
59 arrow illustrating rotation of support member
61 forming structure (isopipe)
63 isopipe cavity or trough
65 inlet pipe
67 root of isopipe
69 converging side of isopipe
71 converging side of isopipe
75 vertical edge of glass ribbon
77 bead portion of glass ribbon
79 bead portion of glass ribbon
81 arrows representing downward motion of glass ribbon
83 stub roller assembly
91 stub roller

DETAILED DESCRIPTION OF THE PREFERRED EMBODIMENT

The following discussion is in terms of a fusion downdraw process (also known as a fusion process, an overflow downdraw process, or an overflow process), it being understood that the methods and apparatus disclosed and claimed herein are also applicable to other downdraw processes such as a slot draw process, as well as to processes that operate horizontally, such as the float process. The discussion is also in terms of stub rollers, it being understood that the methods and apparatus disclosed and claimed herein are applicable to any shaft which contacts a moving glass ribbon, whether used as a stub roller or for some other purpose. As fusion apparatus and stub rollers are known in the art, details are omitted so as to not obscure the description of the example embodiments.

Figure 11:
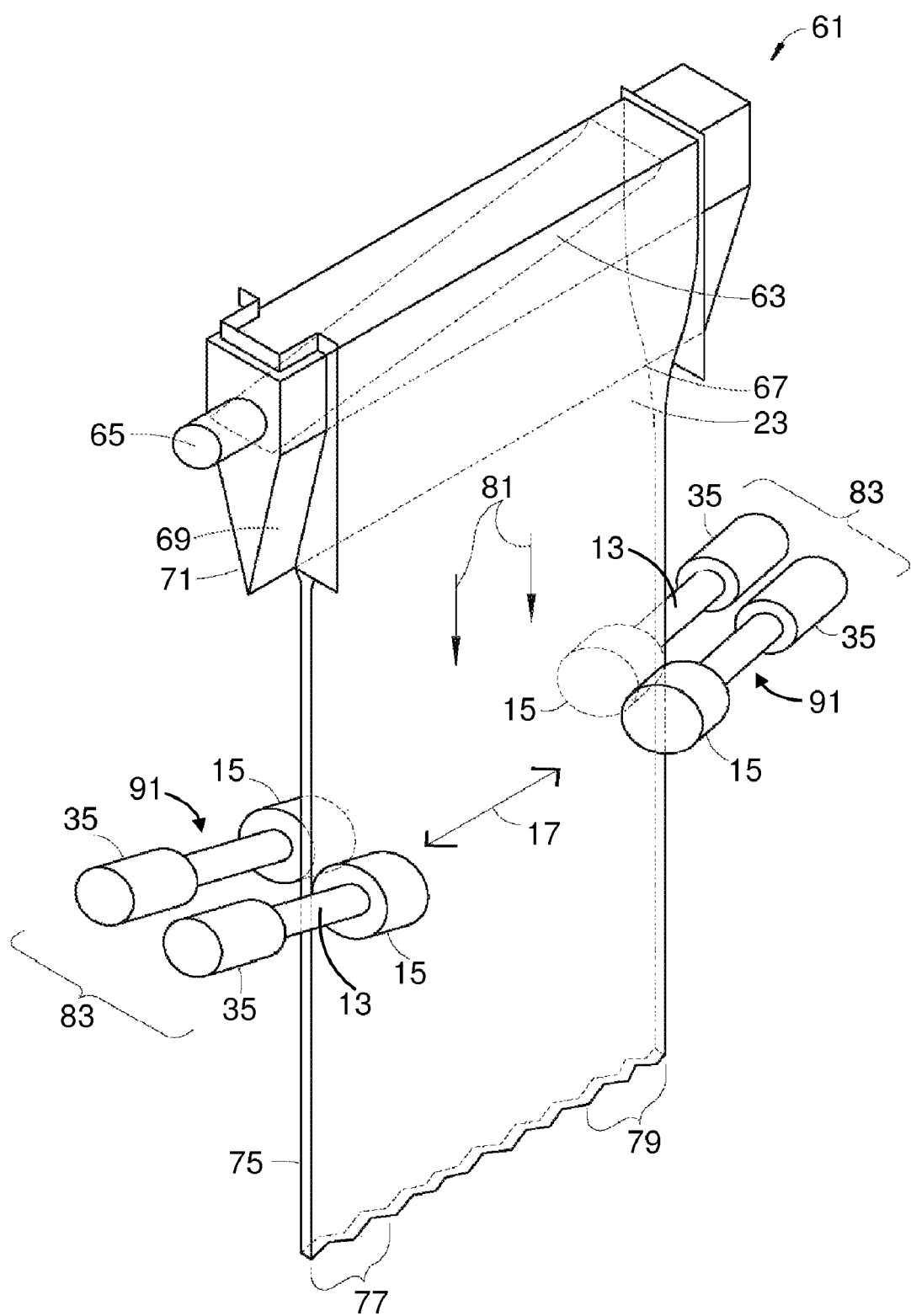
FIG. 11 is a schematic diagram of a fusion downdraw system employing stub rolls.

As shown in FIG. 11, a typical fusion process employs a forming structure (isopipe) 61, which includes a cavity 63 which receives molten glass from an inlet pipe 65. The isopipe includes root 67 where molten glass from the isopipe's two converging sides 69 and 71 join together to form ribbon 23. Ribbon 23 includes bead portions 77 and 79, adjacent to its vertical edges 75. After leaving the root, the ribbon traverses edge and pulling rollers (not shown), with the edge rollers being used to control the width of the ribbon and the pulling rolls being used to apply tension to the ribbon causing it to move downward at a prescribed rate. In FIG. 11, this downward motion is shown by arrows 81.

Also shown in FIG. 11 are two stub roller assemblies 83. Each stub roller assembly includes two stub rollers 91, each of which includes a shaft 13 which comprises a roller 15 which contacts glass ribbon 23 and a bearing assembly 35. The stub rollers can be free turning or driven by a motor (not shown). The rollers generate a tension force in ribbon 23 shown by arrow 17 in FIG. 11. The rollers also generate a pinch force oriented normal to the surface of the ribbon. The pinch force can, for example, be set via a weight applied to a lever arm attached to the stub roller.

In accordance with certain embodiments, the tension force across the ribbon and/or the pinch force at one or more of the stub rollers is monitored in real time. More precisely, the corresponding reaction forces (in the sense of Newton's third law) in the stub roller's shaft are monitored and used as a measure of the forces in the glass ribbon. Previously, the tension forces in the glass ribbon were unknown and no known method existed to measure them in real time or otherwise. In addition, the pinch force that each stub roller applies to the ribbon is also monitored, again in real time. Previously, the pinch force was estimated analytically and not monitored in real time. By monitoring these forces, process engineers are provided with a more fundamental understanding of the forming process. Such understanding, in turn, can be used to alter the process and improve glass attributes, such as, edge stresses and sheet flatness.

In broad outline, the tension and pinch forces in the shaft of the stub roller and thus in the glass ribbon are monitored using a flexing member to which the stub roller is mounted. The flexing member is designed to undergo small deflections in orthogonal directions, i.e., the tension and pinch directions, when a load having force components in those directions is applied to the roller by the glass. The small deflections of the flexing member are detected by displacement sensors, at least one sensor being used for each orthogonal axis along which forces are measured. By measuring the deflections and then correlating them to deflections produced by known loads, the orthogonal components of the force applied to the roller can be measured.

The flexing member is designed to substantially only measure loads along specified orthogonal axes even though loads are applied in multiple directions. More particularly, the flexing member is designed so that it has at least one portion that deflects in the direction of interest when a specific load is applied but has near zero deflection along the same direction when transverse loads are applied. A displacement sensor is then located to detect deflections of that portion of the flexing member. In this way, the flexing member/displacement sensor combination measures deflections of the flexing member from loads along the direction of interest, but loads in transverse directions will have only minimal effect on the sensor.

The flexing member is also designed to be stiff enough to not adversely affect (upset) the glass forming process. In particular, it has been found that a flexing member having a high compliance can cause the forming process to become unstable. A stiff flexing member leads to small deflections, but in practice it has been found that accurate force monitoring can still be achieved provided a displacement sensor having a high resolution is used. Examples of suitable high resolution displacement sensors include inductive sensors, i.e., eddy current sensors, piezoelectric sensors, strain gages, capacitive sensors, and optical sensors. It should be noted that the stiffer the flexing member, the more sensitive the displacement sensor needs to be and vice versa. A force gage such as a load cell could also be used in place of a displacement sensor. It should be noted that the load cell would not provide a direct measurement of force since the load is being shared by each of the webs, so a calibration of the load cell would be necessary.

In one embodiment, the apparatus includes a center beam (support member) surrounded by an outer frame. The center beam is connected to the outer frame by a series of thin webs, and the roller is attached to the center beam. The outer frame is fixed relative to the frame of the glass making machine while the center beam is allowed to deflect relative to the outer frame due to the flexing of the thin webs.

When an axial load is applied to the roller via the glass motion, the force is transferred through the webs into the fixed frame. The force causes the webs to deflect like a spring. The apparatus includes a sensor that measures the relative deflection of the center beam with respect to the outer frame. By performing a calibration process whereby a series of known loads are applied and the deflections recorded and by then using interpolation, the load can be calculated for any measured deflection. In the case of thin flat webs, the load versus deflection is linear which allows for a simple calculation of the load by using the slope of the force versus displacement calibration curve. When a normal load, as opposed to an axial load, is applied to the roller, the force is again transferred through the webs into the fixed frame. In this case, the motion of the center beam is a rotation, rather than a translation. Again, a series of known loads are used to calibrate the rotation and by using interpolation, the normal load can be calculated for any measured rotation. As with an axial load, for thin flat webs, the load versus deflection is linear.

To provide sufficient stiffness, the webs are made of a material having a high modulus of elasticity, such as, a ceramic or a metal such as stainless steel, e.g., 17-4 stainless steel. In addition to a high elastic modulus, the material needs to have a high yield strength to withstand the stresses induced in the webs. An estimate of the number of webs and the material properties appropriate for a specific application can be obtained by, for example, modeling the webs as cantilevers. See, for example, Mechanical Analysis and Design by Arthur H. Burr, Elsevier North Holland, Inc., 1981, page 400. A finite element analysis can also be used for this purpose. In addition to a high elastic modulus and high yield strength, the material needs to be resistant to corrosion at elevated temperatures, such as those associated with glass making equipment, since corrosion of the webs will change their stiffness and thus adversely affect the accuracy of the measurements made by the monitoring apparatus. Again, various ceramics and stainless steel can withstand glass making temperatures for extended periods of time without substantial deterioration. In one embodiment, the webs and fixed frame can be made from a single block of material, e.g., a single block of stainless steel.

In certain preferred embodiments, the monitoring of the axial load and the monitoring of the normal load are substantially independent of one another. That is, the cross-talk between the two determinations, i.e., the error in either determination as a result of the presence of the other force, is less than 1%. Thus, for example, if the device is calibrated using one of the two forces and then the other force is applied, the change in the measured values will be less than 1%.

Referring now to FIGS. 1-10, a support assembly 7 is shown that is suitable for monitoring both the tension 17 and pinch force 19 associated with the contact of a stub roller with a glass ribbon. In FIG. 1, the glass ribbon is assumed to be moving downward so that shaft 13 turns counterclockwise as seen from the shaft (see reference number 2 1). It should be noted that in an opposing assembly (not shown) the shaft turns clockwise.

In overview, apparatus 7 includes a support member 39 (see, for example, FIG. 7) which supports the shaft 13 of the stub roller. The support member undergoes linear displacement (see 45 in FIG. 7) in response to tension 17 and rotation (see reference number 59 in FIG. 10) in response to pinch force 19. As discussed above, in practice, the linear displacement and rotation are detected and then converted to force values by a calibration procedure in which known loads are applied to the shaft and the resulting linear displacements and rotations are measured.

Figure 2:
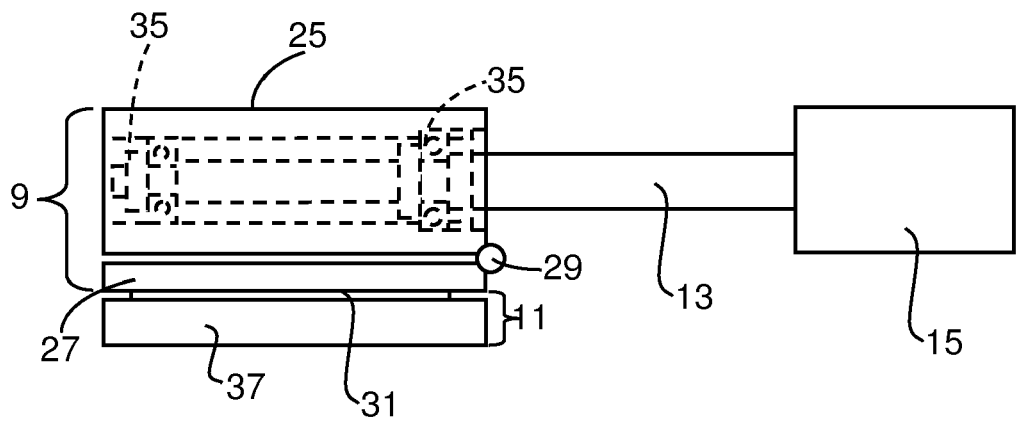
FIG. 2 is a schematic side view of the embodiment of FIG. 1, with the apparatus' shaft in a horizontal orientation.
Figure 3:
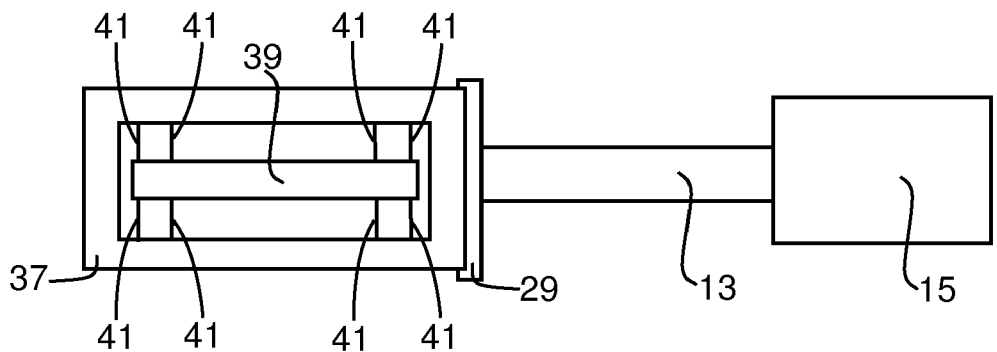
FIG. 3 is a schematic bottom view of the embodiment of FIG. 1.
Figure 4:
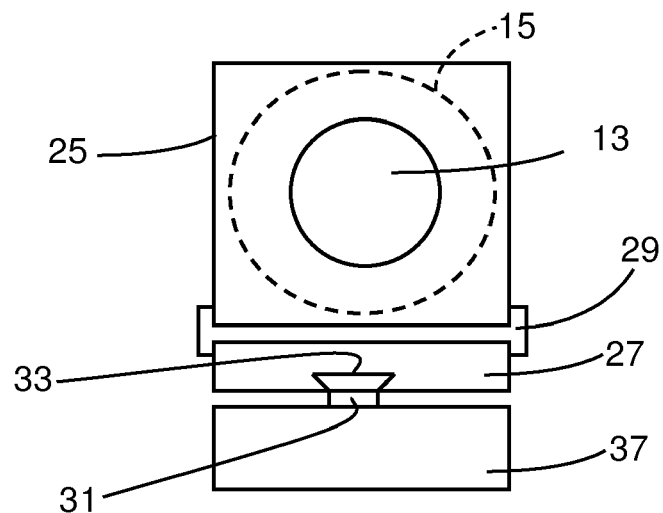
FIG. 4 is a schematic end view of the embodiment of FIG. 1 as seen from the left side of FIG. 2.
Figure 5:
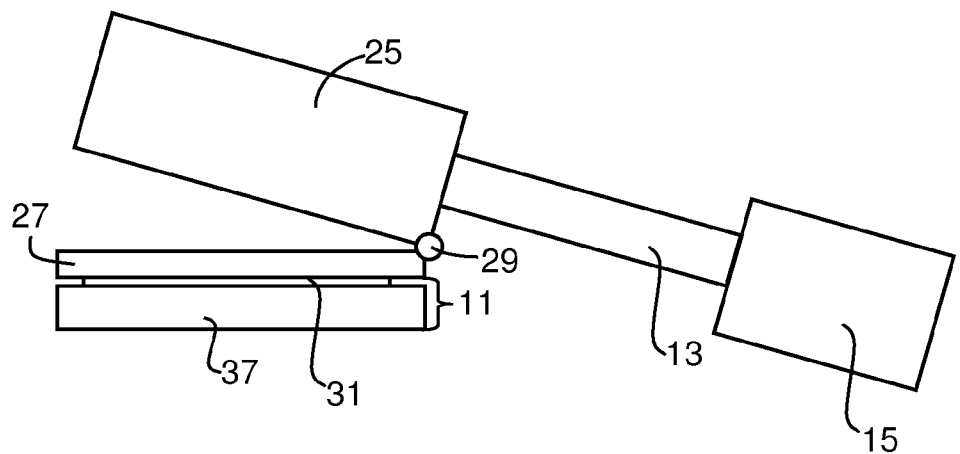
FIG. 5 is a schematic side view of the embodiment of FIG. 1, with the apparatus' shaft in a downwardly angled orientation.
Figure 6:
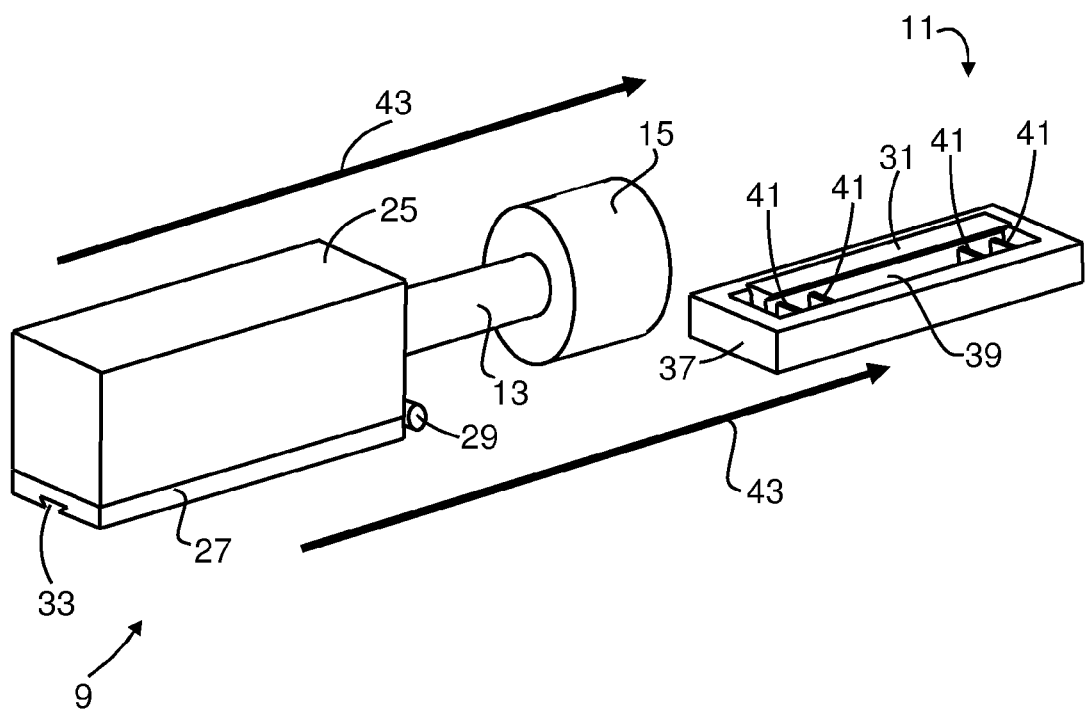
FIG. 6 is a schematic perspective view illustrating assembly of the apparatus of FIG. 1.

As shown most clearly in FIGS. 1, 2, and 6, assembly 7 includes two subassemblies 9 and 11 which in the embodiment shown are separable from one another. Subassembly 9 includes shaft 13 and its roller 15, while subassembly 11 includes support member 39 and its associated equipment for detecting linear displacements and rotations of the support member. By being separable, a stub roller can be replaced (e.g., as part of regular maintenance), while leaving the roller's support member and its associated equipment in place. As shown most clearly in FIG. 6, subassemblies 9 and 11 can be equipped with a female dovetail 33 and a male dovetail 31, which allows the two subassemblies to be separated and rejoined by a linear motion as illustrated by reference number 43 in FIG. 6. In addition to facilitating assembly and disassembly, a dovetail joint when locked in place by, for example, a moveable gib, provides a solid connection between the subassemblies as is desirable for making force measurements. Other types of connections between the subassemblies can, of course, be used in place of a dovetail, e.g., the subassemblies can be bolted together. Also, assembly 7 can be constructed as a unitary device without subassemblies if desired.

In the embodiment shown, subassembly 9 includes housing 25 and plate 27 which are connected to one another by pivot 29. The pivot allows shaft 13 and its roller 15 to be oriented at an angle below horizontal as illustrated in FIG. 1, while still leaving plate 27 in a horizontal plane. The particular angle chosen for shaft 13 will depend on the application and the desired amount of tension to be applied to the ribbon by the roller. Rather than using a pivot, shaft 13 and its roller 15 can be oriented at a fixed angle if desired. Subassembly 9 also includes bearing assembly 35 within housing 25 (see FIG. 2). As discussed above, shaft 13 and its roller 15 can be free turning or driven. In the latter case, shaft 13 will be connected to suitable drive apparatus (not shown).

Figure 7:
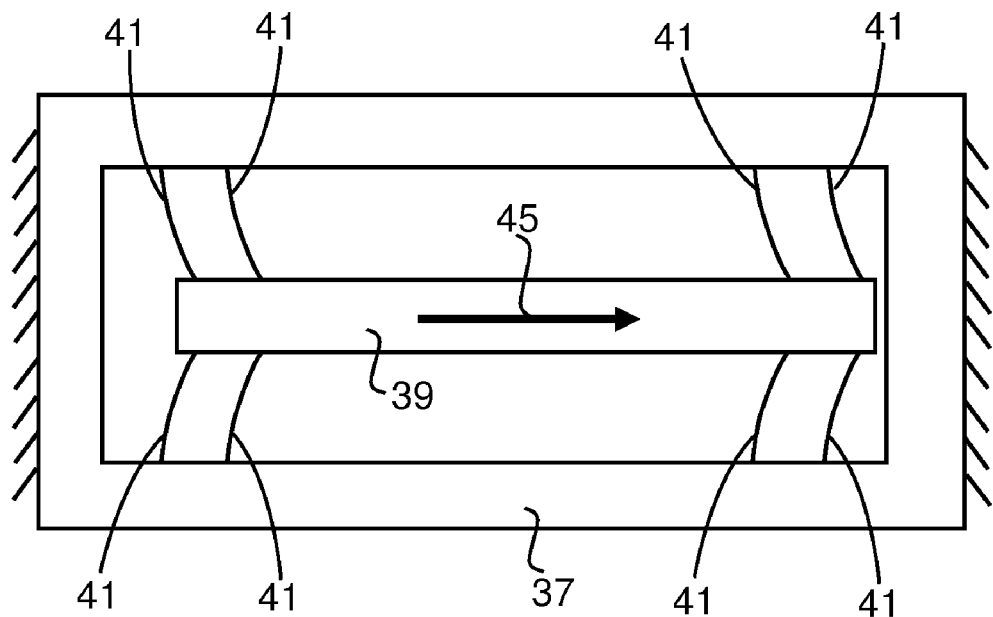
FIG. 7 is a schematic bottom view illustrating displacement of the support member of the apparatus of FIG. 1. The amount of displacement is exaggerated in this figure for purposes of illustration.

Subassembly 11 includes support member 39 and frame 37. During use, support member 39 is oriented parallel to the surface of ribbon 23 in a plane perpendicular to the ribbon (i.e., a horizontal plane for a downdraw process) so that the support member is responsive to across-the-ribbon forces applied to shaft 13. In particular, as illustrated in FIG. 7, when a force is applied to shaft 13 which includes a force component in the across-the-ribbon direction, e.g., in the direction of arrow 17 of FIG. 1, support member 39 undergoes a linear displacement in the direction of that force component, as illustrated by arrow 45 in FIG. 7. More particularly, in the embodiment shown, support member 39 undergoes such a linear displacement as a result of elastic deformation of webs 41. For purposes of illustration, only eight webs are shown in FIG. 7 and the magnitude of the webs' deformation has been exaggerated. In practice, more than eight webs could typically be used, e.g., sixteen webs. Importantly, the deformation of webs 41 is frictionless so that the presence of frictional forces does not interfere with the monitoring of the force applied to shaft 13. Although webs are preferred for support member 39, other supports can be used, e.g., springs of various configurations can be employed for this purpose.

Figure 8:
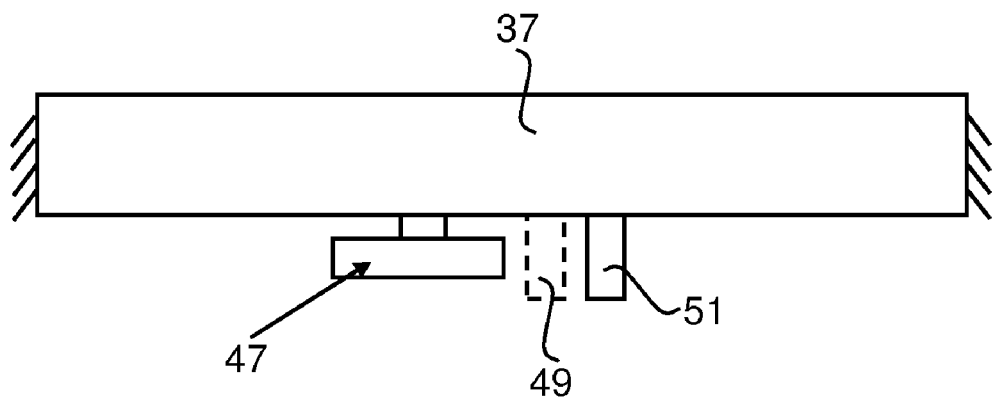
FIG. 8 is a schematic side view illustrating detection of the displacement of the support member of the apparatus of FIG. 1. The amount of displacement is exaggerated in this figure for purposes of illustration.

As illustrated in FIG. 8, the displacement of support member 39 is detected using a sensor 47 and a sensor target 51, e.g., an inductive sensor (see above). One member of the sensor/target combination is attached to support member 39 and the other to frame 37. In FIG. 8, it is assumed that the sensor target is attached to support member 39 and undergoes movement from an initial position 49 to a final position 51. By calibrating this displacement using known forces (see above), the force applied to shaft 13 in the across-the-ribbon direction can be monitored in real time by monitoring the relative movements between the sensor and its target.

Figure 9:
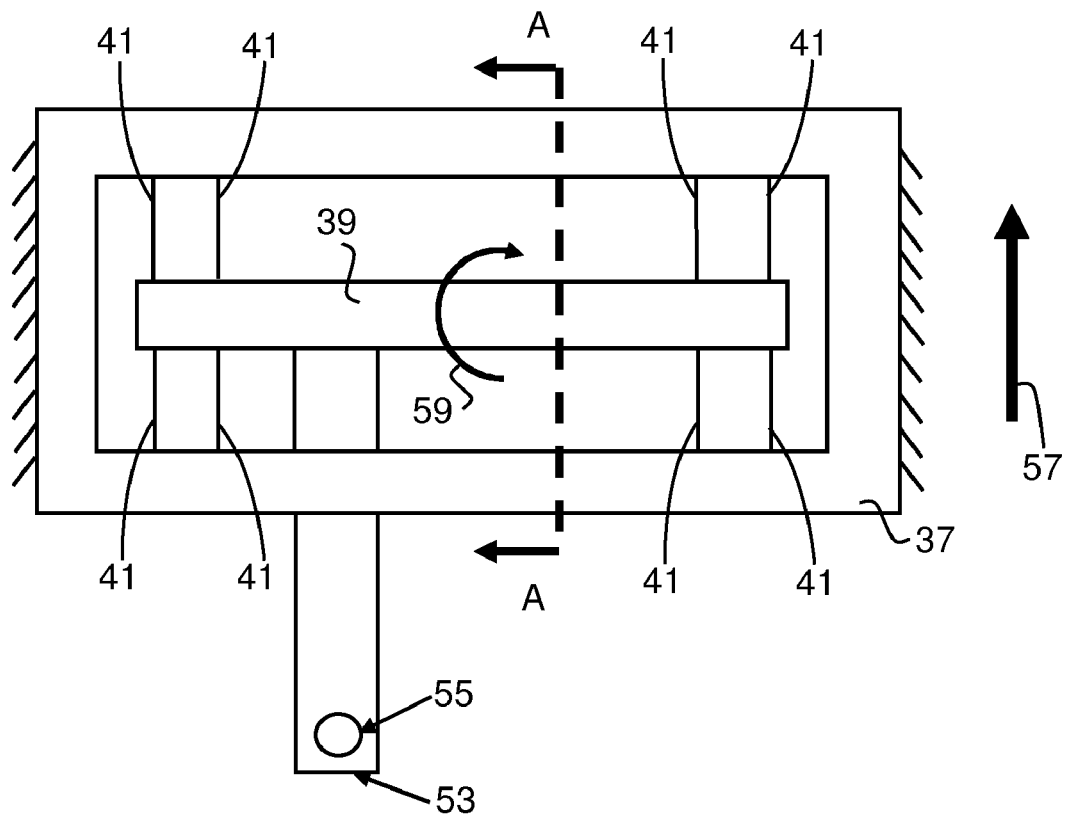
FIG. 9 is a schematic top view illustrating rotation of the support member of the apparatus of FIG. 1.
Figure 10:
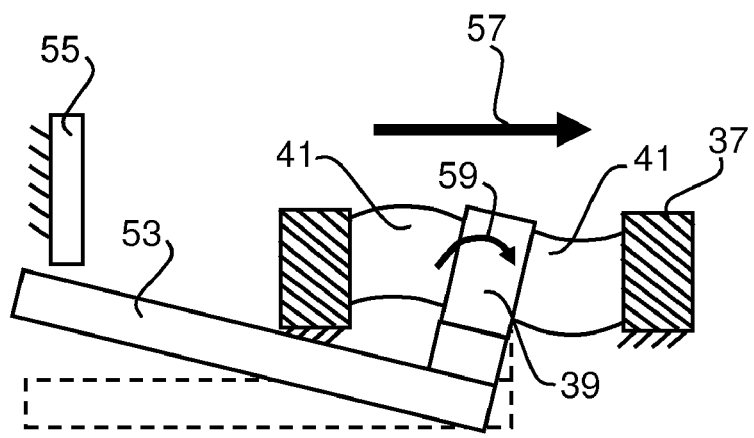
FIG. 10 is a view along line A-A of FIG. 9 illustrating rotation of the support member of the apparatus of FIG. 1. The amount of rotation is exaggerated in this figure for purposes of illustration.

In addition to across-the-ribbon forces, the movement of support member 39 can also be used to monitor forces applied to shaft 13 which include a component in a direction normal to the ribbon, e.g., in the direction of arrow 19 of FIG. 1. In this case, as illustrated in FIGS. 9 and 10, the motion of support member 39 is a rotation (see reference number 59), as opposed to a linear displacement. In these figures, arrow 57 illustrates the force component normal to the ribbon. As best shown in FIG. 10, force 57 causes webs 41 to elastically deform during the rotation. As with the linear displacement of FIG. 7, other means besides webs can be used to support member 39 so that it can undergo rotation in response to a force having a component normal to the surface of the ribbon.

However supported, the rotation of the support member is detected using a sensor/target combination. As shown in FIG. 10, the sensor 55 can be mounted on frame 37 and a target (not shown) can be mounted on an arm 53 attached to support member 39. The arm serves to amplify the rotation of the support member, thus facilitating detection of the rotation. By calibrating the rotation of arm 53 using known forces (see above), the force applied to shaft 13 in a direction normal to the ribbon can be monitored in real time.

It should be noted that as discussed above, the linear displacement of support member 39 in response to a force component in the across-the-ribbon direction is substantially independent of the rotation of the support member in response to a force component normal to the ribbon, thus allowing these force components to be monitored independently of one another. The two components can be monitored simultaneously, sequentially, or periodically, as desired. Also, rather than detecting both linear displacements and rotations, only one of the motions of support member 39 can be detected if only one is of interest for a particular application.

In some applications, it may be desirable to monitor the position of apparatus 7 with respect to ribbon 23. In such a case, a target, e.g., an optical target, can be mounted on the outside surface of the apparatus and its position detected as a function of time. As another alternative, a cable transducer can be attached to apparatus 7 and used to monitor any changes in the location of the apparatus, e.g., as a result of wear of roller 15 over time.

A variety of modifications that do not depart from the scope and spirit of the invention will be evident to persons of ordinary skill in the art from the foregoing disclosure. For example, although shaft 13 in the above discussion has included a roller which contacts the glass ribbon, the disclosure can also be practiced using a shaft without a roller, with a portion of the shaft proximal to the ribbon making contact with the ribbon. The following claims are intended to cover this and other modifications, variations, and equivalents of the specific embodiments set forth herein.

What is claimed is:

1. A method for monitoring a component of the force applied to a shaft as a result of contact of a portion of the shaft with a moving glass ribbon, the force component being in an across-the-ribbon direction, the method comprising:
    (a) contacting a portion of a shaft with a moving glass ribbon;
    (b) supporting the shaft with a support member that undergoes linear displacement in the across-the-ribbon direction in response to the application to the shaft of a force which includes the across-the-ribbon force component; and
    (c) monitoring the linear displacement of the support member.

2. The method of claim 1 wherein
    (a) the support member undergoes rotation about an axis in response to the application to the shaft of a force which includes a component in a direction normal to the ribbon, said axis being parallel to the surface of the ribbon; and
    (b) the method further comprises monitoring the rotation of the support member.

3. The method of claim 2 wherein the monitoring of the linear displacement of the support member and the monitoring of the rotation of the support member are substantially independent of one another.

4. The method of claim 1, 2, or 3 wherein the support member is supported by a plurality of webs which elastically deform during linear displacement of the support member so that the linear displacement is frictionless.

5. The method of claim 1 wherein the linear displacement is linearly related to the force component in the across-the-ribbon direction.

6. A method for monitoring a component of the force applied to a shaft as a result of contact of a portion of the shaft with a moving glass ribbon, the force component being in a direction normal to the ribbon, the method comprising:
    (a) contacting a portion of a shaft with a moving glass ribbon;
    (b) supporting the shaft with a support member that undergoes rotation about an axis in response to the application to the shaft of a force which includes the normal-to-the-ribbon force component, said axis being parallel to the surface of the ribbon; and
    (c) monitoring the rotation of the support member.

7. The method of claim 6 wherein the support member is supported by a plurality of webs which elastically deform during rotation of the support member so that the rotation is frictionless.

8. The method of claim 6 wherein the rotation is linearly related to the force component in the normal-to-the ribbon direction.

9. The method of claim 1 wherein the portion of the shaft that contacts the molten glass comprises a driven or free turning roller.

10. The method of claim 1 wherein the shaft is supported so that it can be pivoted about an axis which is normal to the plane of the ribbon.

11. The method of claim 1 wherein the shaft is releasably connected to the support member.

12. Apparatus for monitoring a component of an axial force which acts along a centerline of a shaft comprising:
(a) a shaft having a centerline;
(b) a support assembly for the shaft, said support assembly comprising a support member that is linearly displaceable in response to a component of an axial force which acts along the centerline of the shaft, the displacement being along a line and the line and the shaft's centerline lying in a common plane or in planes that are parallel to one another; and
(c) a sensor for monitoring linear displacement of the support member along the line;
wherein:
(i) a portion of the shaft is adapted to contact a newly-formed, moving glass ribbon during use of the apparatus;
(ii) the support assembly comprises a plurality of webs which support the support member; and
(iii) the webs are sufficiently stiff so that contact of said portion of the shaft with a newly-formed, moving glass ribbon during use of the apparatus does not destabilize formation of the ribbon.

13. The apparatus of claim 12 wherein:
(a) the support member is rotatable in response to a force having a component normal to the centerline of the shaft; and
(b) the apparatus comprises a sensor for monitoring rotation of the support member.

14. The apparatus of claim 12 wherein the webs elastically deform during linear displacement of the support member so that the linear displacement is frictionless.

15. The apparatus of claim 13 wherein the webs elastically deform during rotation of the support member so that the rotation is frictionless.

16. The apparatus of claim 12 wherein the support assembly comprises a pivot for adjusting the orientation of the shaft's centerline with respect to the support member.

17. The apparatus of claim 12 wherein the shaft supports a roller and the support assembly comprises a bearing assembly for the shaft.

18. The apparatus of claim 12 wherein:
(a) the support assembly comprises a first subassembly that is affixed to the shaft and a second subassembly that comprises the support member; and
(b) the first subassembly is releasably connected to the support member.

19. The apparatus of claim 18 wherein the first subassembly is connected to the support member by a dovetail joint.

* * * * *